United States Patent [19]

Hess et al.

[11] 3,940,350

[45] Feb. 24, 1976

[54] MOULDING COMPOSITIONS BASED ON UNSATURATED POLYESTERS, COPOLYMERISABLE VINYL MONOMERS AND CELLULOSE ESTERS

[75] Inventors: Bernhard Hess, Kapellen; Karl Raichle, Krefeld-Bockum; Hansjochen Schulz-Walz, Meerbusch; Bernd Peltzer; Ludwig Bottenbruch, both of Krefeld-Bockum; Leonard Goerden, Grefrath, all of Germany

[73] Assignee: Bayer Aktiengesellschaft, Germany

[22] Filed: Jan. 14, 1974

[21] Appl. No.: 433,347

[30] Foreign Application Priority Data
Jan. 20, 1973  Germany............................ 2302842

[52] U.S. Cl. ................................................. 260/16
[51] Int. Cl.² ...................... C08L 1/14; C08L 67/06

[58] Field of Search ....................................... 260/16

[56] References Cited
UNITED STATES PATENTS

| | | | |
|---|---|---|---|
| 3,642,672 | 2/1972 | Kroekel | 260/16 |
| 3,711,432 | 1/1973 | Shah | 260/16 |

FOREIGN PATENTS OR APPLICATIONS

| | | | |
|---|---|---|---|
| 936,351 | 9/1963 | United Kingdom | 260/862 |

*Primary Examiner*—Harold D. Anderson
*Assistant Examiner*—Edward Woodberry
*Attorney, Agent, or Firm*—Connolly and Hutz

[57] ABSTRACT

Polyester masses which are curable with low shrinkage containing non-crystallising unsaturated polyesters having a definite styrene compatibility, copolymerisable vinyl monomers and cellulose acetobutyrate and/or cellulose acetopropionate.

4 Claims, No Drawings

MOULDING COMPOSITIONS BASED ON UNSATURATED POLYESTERS, COPOLYMERISABLE VINYL MONOMERS AND CELLULOSE ESTERS

The invention relates to mixtures containing
a. 20 – 70 per cent by weight of non-crystallising polyesters containing $\alpha,\beta$-unsaturated dicarboxylic acid radicals,
b. 20 – 70 per cent by weight of copolymerisable vinyl monomers and
c. 3 – 30 per cent by weight of cellulose acetobutyrate (CAB) and/or cellulose acetopropionate (CAP), characterised in that the non-crystallising polyesters containing $\alpha,\beta$-unsaturated dicarboxylic acid radicals have a styrene compatibility of between 30 per cent by weight and 90 per cent by weight, preferably between 35 per cent by weight and 90 per cent by weight, of unsaturated polyester, and a content of between 0.53 and 0.20, preferably between 0.50 and 0.20, equivalent of $\alpha,\beta$-ethylenically unsaturated dicarboxylic acid radicals, capable of polymerisation by radical mechanisms, per 100 g of unsaturated polyester.

The mixtures according to the invention can be converted by the processes customary in industry to give moulding and pressing compositions which cure, with little shrinkage, to give shaped articles; polymerisation inhibitors, polymerisation initiators, optionally chemical thickeners based on oxides or hydroxides of a metal of main group 2 of the periodic system, and optionally thixotropic agents and/or fillers and/or fibrous materials and/or pigments and/or other additives for resins based on unsaturated polyesters are added or used conjointly. 2

The invention thus further relates to moulding compositions or pressing compositions based on the three-component mixtures according to the invention and to the use of these moulding compositions or pressing compositions, which are curable with little shrinkage, for the production of moulded articles.

Previously known three-component systems of comparable composition provide no detailed information on the nature and structure of the unsaturated polyesters to be employed (compare German Patent 970,110, French Pat. No. 1,239,500 and German Pat. No. 1,192,820, Example 3) or demand the use of unsaturated polyesters of which the molecular weight factor per C=C double bond is between 150 and 186, that is to say of which the C=C double bond content lies between 0.667 and 0.537 equivalent per 100 g of unsaturated polyester (DT-OS (German Published Specification) 1,694,857 and DT-OS (German Published Specification) 1,794,323 or U.S. Pat. No. 3,642,672). According to these last-mentioned patent applications it is necessary to impose such a restriction on the unsaturated polyesters if moulding compositions based on unsaturated polyesters, copolymerisable monomers and cellulose esters are to be of industrial interest and are to find use in moulding compositions which can be cured with little shrinkage.

According to U.S. Pat. No. 3,642,672, column 7, lines 69 et seq, unsaturated polyesters with a lower double bond content are unsuitable for the purpose in question.

This observation agrees with the previously prevailing teaching (DT-AS (German Published Specification) 1,135,169) according to which compositions based on unsaturated polyester resins when cured display a shrinkage which is the lower the more heavily the unsaturated polyester resins employed can be crosslinked, that is to say the greater is the proportion of unsaturated bonds in the unsaturated polyester resin.

In face of this it was surprising and unforeseeable that it is possible to obtain, based on the three-component mixtures according to the invention, moulding compositions or pressing compositions which can be cured with little shrinkage and which are superior to comparable compositions, based on highly unsaturated polyesters, according to DT-OS (German Published Specification) 1,694,857, DT-OS (German Published Specification) 1,794,323 or U.S. Pat. No. 3,642,672.

In addition, the highly reactive unsaturated polyesters claimed in the cited applications barely permit a variation in the esterification components, and this greatly restricts the number of usable polyesters and hence also their pattern of properties. On the other hand, the unsaturated polyesters claimed according to the present invention permit a broad variation in the esterification components, as a result of which particularly desired properties are readily obtainable. Thus, for example, the tendency of thick-walled ribs or projecting pieces in the pressing to crack, which is found when unsaturated polyesters of high double bond content are used, can be avoided by using unsaturated polyesters which have a very low double bond content but which are compatible with styrene in accordance with the invention.

The mixtures according to the invention are most appropriately produced by dissolving the cellulose ester in styrene at approx. 80°C, mixing the solution, at this temperature, with the solution of the unsaturated polyester in styrene and then cooling the resulting mixture to room temperature.

To prepare a pressing composition according to the invention, the mixtures according to the invention are compounded with, for example, glass fibres, fillers and peroxide and optionally chemical thickeners such as, for example, magnesium oxide or calcium oxide or magnesium hydroxide or calcium hydroxide. Such a pressing composition can be heat-cured to give shaped articles.

The most streamlined method for the production of larger shaped articles is to use thickened resin mats. These are prepared by impregnating glass fibre mats with the pressing compositions described above which contain magnesium oxide but are free of glass fibres, and protecting their surfaces on either side by means of covering films. The films prevent the evaporation of the vinyl monomer, permit rolling up the mats, and hence permit a space-saving form of storage. After the resin mats have thickened after a ripening time of approx. 1 to 10 days, the covering films can be pulled off without damaging the resin mats and the mats can be cut into shape appropriately and be pressed hot to give mouldings of low shrinkage.

Unsaturated polyesters in the sense of the invention are the customary polycondensation products of $\alpha,\beta$-unsaturated dicarboxylic acids with polyhydroxy compounds, especially dihydroxy compounds (compare Bjorksten et al. "Polyesters and their Application," Reinhold Publishing Corp., New York, 1956); the crystallising unsaturated polyesters obtainable according to the process claims of German Patent Application A 4,446, 39c, 16, U.S. priority 22.11.1944 are excepted.

Examples of suitable α,β-unsaturated dicarboxylic acids for the preparation of the unsaturated polyesters are maleic acid, fumaric acid, itaconic acid and, where relevant, their anhydrides. These can optionally be employed as mixtures, for example with adipic acid, phthalic acid, isophthalic acid, tetrahydrophthalic acid, terephthalic acid, tetrachlorophthalic acid, hexachloroendomethylenetetrahydrophthalic acid and their anhydrides. Monocarboxylic acids, for example acrylic acid or benzoic acid, can also be used conjointly in synthesising the unsaturated polyesters.

Examples of suitable polyhydroxy compounds are ethylene glycol, diethylene glycol, hexamethylene-1,6-diol, 1,2-propylene glycol, dipropylene glycol, 1,3-butanediol, neopentyl glycol, trimethylolpropane allyl ether, 2,2-bis-(4-hydroxycyclohexyl)-propane, 2,2-bis-(4-hydroxyalkoxyphenyl)-propane, trimethylolpropane, glycerine or pentaerythritol; if desired, monohydroxy compounds such as, for example, allyl alcohol, methanol or ethanol can also be used conjointly in synthesising the unsaturated polyesters.

The unsaturated polyesters according to the present invention have molecular weights which can vary within a wide range and are usually between 500 and 5,000, preferably between 1,000 and 3,000.

The acid numbers of the polyesters according to the invention should be between 10 and 100, preferably between 20 and 70; the hydroxyl numbers of the polyesters according to the invention should be between 10 and 150, preferably between 20 and 100.

The content of equivalents of α,β-ethylenically unsaturated dicarboxylic acid esters, capable of polymerisation by radical mechanisms, in the unsaturated polyester should be between 0.53 and 0.20, preferably between 0.50 and 0.20, per 100 g of unsaturated polyester and can be derived as follows from the composition of the starting components used for the preparation of the unsaturated polyester:

Equivalents of ethylenedicarboxylic acid per 100 g = (A × 100/B)

A = mols of ethylenedicarboxylic acid per polyester batch

B = parts by weight of the polyester batch after deducting the water of esterification.

Example: Calculation of the ethylenedicarboxylic acid content of UP 1 b:

| Maleic anhydride | 803 g | = | 8.2 | mols |
|---|---|---|---|---|
| Phthalic anhydride | 266 g | = | 1.8 | " |
| 1,2-Propylene glycol | 836 g | = | 11.0 | " |
| | 1,905 g | | | |
| − Water | 180 g | = | 10.0 | " |
| | 1,725 g | | | |

Equivalents of ethylenedicarboxylic acid per 100 g:

$$\frac{8.2 \times 100}{1,725} = 0.48$$

According to the invention, amongst the large number of unsaturated polyesters obtainable from the components mentioned (carboxylic acids and hydroxy compounds), only those are suitable which have a styrene compatibility of between 30 per cent by weight and 90 per cent by weight, preferably between 35 per cent by weight and 90 per cent by weight, of unsaturated polyester, provided that their content of α,β-ethylenically unsaturated dicarboxylic acid radicals polymerisable by radical mechanisms lies between 0.53 and 0.20 equivalent per 100 g of unsaturated polyester.

The styrene compatibility or styrene solubility of unsaturated polyesters is a known concept in the chemistry and technology of the unsaturated polyester resins: compare Johannes Scheiber, "Chemie und Technologie der künstlichen Harze" ("Chemistry and Technology of synthetic Resins"), volume I, "Die Polymerisatharze" ("The Polymerisation Resins"), Wissenschaftliche Verlagsgesellschaft MBH, Stuttgart, 1961, 2nd edition, pages 563 et seq, especially pages 566 and 571/572.

The styrene compatibility of the unsaturated polyesters required according to the invention, specified in per cent by weight of unsaturated polyester relative to the total amount of unsaturated polyester and styrene, is defined and determined as follows:

At approx. 80° to 100°C, just sufficient unsaturated polyester is dissolved in styrene to give a clear solution of known concentration after immediate cooling to room temperature. Further styrene is added whilst stirring at room temperature until the solution turns cloudy. The concentration in per cent by weight of the unsaturated polyester, relative to the total amount of styrene and unsaturated polyester, at the cloud point is defined as the styrene compatibility.

The cloud point detection can be facilitated by using a black background whilst carrying out the dilution with styrene. The styrene used appropriately contains major amounts of an inhibitor, for example 0.2% of tert.-butylpyrocatechol, to avoid cloudiness due to foreign substances, such as, for example, polystyrene, rendering the determination more difficult.

The following example may be given by way of illustration:

E (g) = sample, in grams, of the clear polyester solution in styrene, containing P% of unsaturated polyester, for example 20 g P (%) = per cent by weight of unsaturated polyester, dissolved in styrene to give a clear solution, for example 60%

S (g) = amount of styrene added to reach the cloud point, in grams, for example 10 g $$\text{Styrene compatibility} = \frac{E(g) \cdot P(\%)}{E(g) + S(g)},$$

$$\text{for example:} \quad \frac{20\text{ g} \cdot 60\%}{20\text{ g} + 10\text{ g}} = 40\%$$

As is known from experience, the styrene compatibility of an unsaturated polyester is influenced by the polyester components involved in its synthesis, that is to say by the acids and hydroxy compounds used to synthesise the polyester.

Examples of esterification components which confer incompatibility with styrene are maleic acid, its anhydride, fumaric acid, ethylene glycol, diethylene glycol and hexamethylene glycol.

Examples of esterification components which confer compatibility with styrene are phthalic acid, isophthalic acid, tetrachlorophthalic acid, hexachloroendomethylenetetrahydrophthalic acid or its anhydrides, 1,2-propylene glycol, dipropylene glycol, 1,3-butylene glycol, neopentyl glycol, trimethylolpropane allyl ether, perhydro-bisphenol, bisoxalkylbisphenol and the like. It can at times also be of advantage conjointly to use monohydric, or more than dihydric, alcohols and/or monobasic or more than dibasic carboxylic acids, bearing in mind the functionality, and the use of such compounds also influences the styrene compatibility.

The unsaturated polyesters are employed in amounts of 20 to 70 per cent by weight, preferably in amounts of 30 to 50 per cent by weight, in each case relative to the threecomponent mixture without other additives. The unsaturated polyesters are optionally prepared in the form of solutions in copolymerisable monomers, having the usual solids contents of between 80 per cent by weight and 50 per cent by weight, and are used in the form of such solutions for the preparation of the three-component mixtures according to the invention.

The customary vinyl monomers, without limitation, are suitable for use as copolymerisable vinyl monomers in the sense of the invention; styrene, styrenes substituted in the aryl radical such as, for example, vinyl toluenes, tert.- butylstyrenes and chlorostyrenes, and divinylbenzene, are preferred; these can also be employed as a mixture with minor amounts of acrylic acid or methacrylic acid or their $C_1$-$C_4$-alkyl esters, vinyl esters, allyl esters or methallyl esters.

The vinyl monomers are employed in amounts of 20 to 70 per cent by weight, preferably in amounts of 40 to 60 per cent by weight, relative to the three-component mixture without other additives.

Cellulose esters according to the invention should be cellulose acetobutyrate (CAB) or cellulose acetopropionate (CAP), in which at least half the hydroxyl groups of the cellulose which are capable of esterification are esterified with butyric acid or propionic acid, respectively. The molecular weights of the cellulose esters to be used can vary within wide limits. They are usually specified in the form of solution viscosities. Cellulose esters with a viscosity of 0.1 – 20 seconds according to ASTM-D-871-56, equation B, are preferred. The cellulose esters are obtained according to customary methods from cellulose and the corresponding acid anhydrides. The cellulose esters to be used according to the invention do not contain any acid groups.

CAB containing about 17 to 21 per cent by weight of acetic acid, relative to cellulose ester, and about 45 to 50 per cent by weight of butyric acid, relative to cellulose ester, and having a viscosity, according to ASTM-D-871-56, equation B, of 0.1 – 5 seconds, and OH numbers of 0 to 70 mg of KOH/g of CAB is particularly suitable. CAB and/or CAP are employed in amounts of 3 to 30 per cent by weight, preferably 5 to 20 per cent by weight, relative to the threecomponent system without other additives.

The mixtures according to the invention contain the customary amounts of customary polymerisation inhibitors which prevent premature uncontrolled gelling, for example hydroquinone, toluhydroquinone, p-benzoquinone, p-tert.-butylpyrocatechol, chloranil, naphthoquinone, copper compounds or p-nitrosodimethylaniline.

Examples of suitable radical-forming initiators are benzoyl peroxide, tert.-butyl perbenzoate, tert.-butyl peroxide, cyclohexanone peroxide, tert.-butyl peroctoate, azoisobutyrodinitrile, cumene hydroperoxide and the like.

Known chemical thickeners are the oxides and hydroxides of the metals of main group 2 of the periodic system, preferably the oxides and hydroxides of magnesium and calcium, to which small amounts of water are added optionally.

Suitable thixotropic agents are the customary agents, for example inorganic agents, such as Aerosil, or organic agents which contain acid amide groups or urethane groups, or cyclohexylamides of higher fatty acids (DAS (German Published Specification) 1,182,816 and 1,217,611 and Belgian Patent 693,580).

Customary additives are inert organic fillers, such as calcium carbonate, silicates, aluminas, lime, carbon, reinforcing fibres, such as glass fibres, which can also be in the form of fabrics or mats, synthetic organic fibres, cotton, asbestos or metal fabrics, organic and inorganic pigments, dyestuffs, lubricants and release agents, such as zinc stearate, UV absorbers and the like.

The mixing of the three-component mixtures according to the invention with polymerisation inhibitors, radical-forming agents, chemical thickeners, thixotropic agents and the customary additives is carried out in kneaders or on a roll mill or, in the case of smaller experiments carried out manually, in a mortar; this mixing produces the heat-curable pressing composition or moulding composition according to the invention.

Instead of, or in addition to, glass fibres, it is also possible to employ glass fibre mats or glass fibre fabrics for the preparation of the heat-curable pressing compositions or moulding compositions according to the invention, as has already been mentioned. In that case, the glass fibre mats are impregnated by means of the moulding composition which is to be cured and are then stored for 1 to 10 days in closed containers, for example using covering films.

The heat-curable moulding compositions or pressing compositions according to the invention which contain chemical thickeners have dry, non-tacky surfaces which are free of faults and glossy, after curing.

In addition, and in contrast to the prevailing teaching regarding moulding compositions which can be cured with little shrinkage and are based on three-component mixtures consisting of unsaturated polyesters, copolymerisable vinyl monomers and cellulose esters (according to DT-OS (German Published Specification) 1,694,857, DT-OS (German Published Specification) 1,794,323 and U.S. Pat. No. 3,642,672) it has been found that unsaturated polyesters are in principle suitable for use as components of the three-component mixtures according to the invention regardless of their content of $\alpha,\beta$-ethylenically unsaturated dicarboxylic acid radicals which can be polymerised by radical mechanisms, provided their styrene compatibility is sufficiently low and is between 45 per cent by weight and 90 per cent by weight, preferably between 50 per cent by weight and 90 per cent by weight, of unsaturated polyester.

This finding is surprising and permits the use of unsaturated polyesters of which the C=C double bond content can vary within broad limits and which thus include all customary unsaturated polyesters.

Hence, the present invention also relates to three-component mixtures containing a. 20 to 70 per cent by weight of non-crystallising polyesters containing $\alpha,\beta$-unsaturated dicarboxylic acid radicals, b. 20 to 70 per cent by weight of copolymerisable vinyl monomers and c. 3 to 30 per cent by weight of cellulose acetobutyrate (CAB) and/or cellulose acetopropionate (CAP), characterised in that the styrene compatibility of the noncrystallising polyesters containing α,β-unsaturated dicarboxylic acid radicals is between 45 per cent by weight and 90 per cent by weight of unsaturated polyester.

These mixtures can be converted according to the processes customary in the art to give moulding compositions and pressing compositions which can be cured with little shrinkage, and, as explained at the beginning of this patent application, polymerisation inhibitors, polymerisation initiators, chemical thickeners and optionally thixotropic agents and/or fillers and/or fibrous substances and/or pigments and/or other additives for resins based on unsaturated polyesters are added or used conjointly, as is described and explained in the present patent application.

Accordingly, the present invention also relates to moulding compositions or pressing compositions based on these last-mentioned three-component mixtures and the use of these moulding compositions or pressing compositions, which can be cured with little shrinkage, for the production of shaped articles.

The more detailed explanations given in the present patent application with regard to suitable ratios, definitions of terms, properties, technical advantages, production processes, end uses and fields of use also apply to the lastmentioned three-component mixtures and to the moulding compositions and pressing compositions which can produced therefrom and can be cured with little shrinkage.

Examples and comparison examples

Percentages quoted denote percentages by weight.

Viscosities quoted are measurements made in a Höppler falling ball viscometer at 20°C.

Preparation of the unsaturated polyesters (UP)

The unsaturated polyesters are prepared in a known manner by melt condensation and are dissolved in styrene to give a 65% strength solution. Before dissolving them, hydroquinone is added to the polyester. The composition of the polyesters and the characteristic data of the solutions are shown in the form of a table.

|  | UP 1a comparison | UP 1b comparison | UP 1c |
|---|---|---|---|
| Maleic anhydride, g | 938 | 803 | 794 |
| Phthalic anhydride, g | 64 | 266 | 281 |
| 1,2-Propylene glycol, g | 836 | 836 | 608 |
| Ethylene glycol, g | — | — | 186 |
| Hydroquinone, g | 0.33 | 0.34 | 0.34 |
| Characteristic data of the polyester: | | | |
| Ethylene dicarboxylic acid, equiv/100 g | 0.58 | 0.48 | 0.48 |
| Styrene compatibility, % | 38 | 25 | 38 |
| Characteristic data of the styrene solution: | | | |
| Solids content, g | 65 | 65 | 65 |
| Viscosity (20°C), cP | 2,200 | 2,300 | 2,200 |
| Acid number, mg of KOH/g | 22 | 17 | 18 |

|  | UP 2a | UP 2b | UP 2c | UP 2d |
|---|---|---|---|---|
| Maleic anhydride, g | 882 | 774 | 706 | 666 |
| Phthalic anhydride, g | 148 | 311 | 414 | 474 |
| 1,2-Propylene glycol, g | 494 | 418 | 380 | 342 |
| Ethylene glycol, g | 279 | 341 | 372 | 403 |
| Hydroquinone, g | 0.32 | 0.33 | 0.34 | 0.34 |
| Characteristic data of the polyester: | | | | |
| Ethylene dicarboxylic acid, equiv/100 g | 0.56 | 0.48 | 0.43 | 0.39 |
| Styrene compatibility, % | 56 | 57 | 57 | 56 |
| Characteristic data of the styrene solution: | | | | |
| Solids content, % | 65 | 65 | 65 | 65 |
| Viscosity (20°C), cP | 1,900 | 1,850 | 2,400 | 2,400 |
| Acid number, mg of KOH/g | 23 | 23 | 21 | 22 |

|  | UP 3a | UP 3b | UP 3c |
|---|---|---|---|
| Maleic anhydride, g | 784 | 774 | 774 |
| Phthalic anhydride, g | 296 | 311 | 311 |
| 1,2-Propylene glycol, g | 508 | 456 | 380 |
| Ethylene glycol, g | 267 | 310 | 372 |
| Hydroquinone, g | 0.34 | 0.33 | 0.33 |
| Characteristic data of the polyester: | | | |
| Ethylene dicarboxylic acid, equiv/100 g | 0.48 | 0.48 | 0.48 |
| Styrene compatibility, % | 45 | 50 | 60 |
| Characteristic data of the styrene solution: | | | |
| Solids content, % | 65 | 65 | 65 |
| Viscosity (20°C), cP | 2,200 | 2,700 | 2,500 |
| Acid number, mg of KOH/g | 18 | 19 | 20 |

Preparation of the mixtures according to the invention

To prepare the mixtures according to the invention, 60 parts by weight of the unsaturated polyester solutions UP 1 to 3 are mixed with 40 parts by weight of a solution consisting of 12 parts by weight of a cellulose acetobutyrate (CAB I) and 28 parts of styrene, the solution having been prepared at 80°C.

CAB I is a cellulose acetobutyrate containing 18% of acetic acid and 45% of butyric acid and having a viscosity of 0.2 second according to ASTM-D-871-56, equation B.

Composition of the mixtures according to the invention

| 60 parts by weight of UP 1 to 3 solution, consisting of | | |
|---|---|---|
| | 39 | parts by weight of unsaturated polyester |
| | 21 | parts by weight of styrene |
| 40 parts by weight of CAB I solution, consisting of | | |
| | 12 | parts by weight of CAB I |
| | 28 | parts by weight of styrene |
| 100 parts by weight of mixture | 100 | parts by weight |

Production of the pressing

After storing the resin mats for 7 days at room temperature, the covering films are pulled off and 125 g of a thickened resin mat are pressed for 5 minutes at 145°C, under 120 kg/cm², to give sheets (12 × 12 cm) having a diagonal rib and a projecting piece.

The linear percentage shrinkage, measured over the diagonal rib of the cured sheet produced from the resin mixtures according to the invention, is listed in the table which follows. The values are average values from three different sheets.

Table

| Resin base | % shrinkage |
|---|---|
| UP 1a CAB | 0.098 |
| UP 1b CAB | 0.128 |
| UP 1c CAB | 0.068 |
| UP 2a CAB | 0.080 |
| UP 2b CAB | 0.076 |
| UP 2c CAB | 0.063 |
| UP 2d CAB | 0.064 |
| UP 3a CAB | 0.068 |
| UP 3b CAB | 0.067 |
| UP 3c CAB | 0.067 |

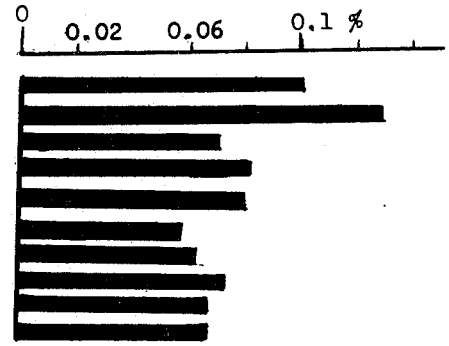

The solutions of polyester in styrene, containing CAB I, are hereafter referred to as UP 1 CAB to UP 3 CAB and represent the examples and comparison tests.

The mixtures according to the invention are in each case assessed from a cured pressing which is produced from thickened resin mats.

Preparation of the resin mats 100 parts by weight of solutions UP 1 CAB to UP 3 CAB are intimately mixed with the additives listed below in a kneader or on a roll mill, the mixture is used to impregnate a glass fibre mat in the ratios indicated, and the mat is protected on both sides with covering films, rolled up and stored for 7 days at room temperature.

Composition of the resin mats

| 100.00 | parts by weight of | UP 1 CAB to UP 3 CAB solution |
|---|---|---|
| 100.00 | " | calcium carbonate |
| 1.50 | " | magnesium oxide |
| 4.00 | " | zinc stearate |
| 1.65 | " | black iron oxide |
| 3.35 | " | red iron oxide |
| 0.75 | " | tert.-butylperbenzoate |
| 52.80 | " | glass fibre mat |

The results in the table confirm the teaching, according to the invention, of the present patent application.

We claim:
1. A mixture containing
   A. 20–70% by weight of a non-crystallizing polyester which is the condensation product of an α,β-unsaturated dicarboxylic acid and a polyhydroxy compound and has an acid number between 10 and 100 and a hydroxyl number between 10 and 150,
   B. 20–70% by weight of a copolymerizable vinyl monomer and
   C. 3–30% by weight of cellulose acetobutyrate, cellulose acetopropionate or a mixture thereof,
   said non-crystallizing polyester having
   1. a styrene compatibility of between 50% by weight and 90% by weight of unsaturated polyester or
   2. a styrene compatibility of between 35% by weight and 90% by weight of unsaturated polyester and a content of between 0.50 and 0.20 equivalent of α,β-ethylenically unsaturated dicarboxylic acid radicals per 100 g. of unsaturated polyester, said percentages by weight of said (A), (B) and (C) being based on the total weight of (A), (B) and (C).

2. The mixture of claim 1 wherein said acid number is between 20 and 70.

3. The mixture of claim 1 wherein said hydroxyl number is between 20 and 100.

4. A moulding or pressing composition containing the mixture of claims.

* * * * *